(12) United States Patent
Lundstrom

(10) Patent No.: US 12,258,074 B1
(45) Date of Patent: Mar. 25, 2025

(54) HINGED TAILGATE BRIDGE

(71) Applicant: Layne Lundstrom, Salt Lake City, UT (US)

(72) Inventor: Layne Lundstrom, Salt Lake City, UT (US)

( * ) Notice: Subject to any disclaimer, the term of this patent is extended or adjusted under 35 U.S.C. 154(b) by 0 days.

(21) Appl. No.: 18/600,009

(22) Filed: Mar. 8, 2024

(51) Int. Cl.
| | |
|---|---|
| *E05D 1/04* | (2006.01) |
| *B62D 33/027* | (2006.01) |
| *B62D 33/03* | (2006.01) |
| *E05D 5/04* | (2006.01) |

(52) U.S. Cl.
CPC ......... *B62D 33/0273* (2013.01); *B62D 33/03* (2013.01); *E05D 1/04* (2013.01); *E05D 5/043* (2013.01); *E05Y 2900/544* (2013.01)

(58) Field of Classification Search
CPC .............. E05Y 2900/544; B62D 33/03; B62D 33/0273; B60R 13/01; B60R 13/06; E05D 1/04; E05D 5/043
See application file for complete search history.

(56) References Cited

U.S. PATENT DOCUMENTS

| | | | | |
|---|---|---|---|---|
| 2,042,911 | A * | 6/1936 | Stannard | B62D 33/0273 296/57.1 |
| 4,763,945 | A * | 8/1988 | Murray | B60R 13/01 296/57.1 |
| 5,188,415 | A * | 2/1993 | Wagner | B62D 33/0273 296/57.1 |
| 5,664,822 | A * | 9/1997 | Rosenfield | B62D 25/2054 16/250 |
| 5,904,391 | A * | 5/1999 | Liljenquest | B62D 33/0273 296/57.1 |
| 6,293,602 | B1 * | 9/2001 | Presley | B62D 33/0276 296/26.11 |
| 6,334,264 | B1 * | 1/2002 | Oh | B60J 5/101 33/645 |
| 6,540,278 | B2 * | 4/2003 | Presley | B62D 33/0273 296/26.11 |
| 6,749,245 | B1 * | 6/2004 | Walker | B62D 33/0273 296/57.1 |
| 7,556,305 | B2 * | 7/2009 | Stratten | B62D 33/03 296/57.1 |
| 8,172,309 | B1 * | 5/2012 | Weir | B32B 1/00 296/183.1 |
| 9,016,753 | B2 * | 4/2015 | McDermott, III | B62D 33/0273 296/57.1 |

(Continued)

*Primary Examiner* — Justin B Rephann
(74) *Attorney, Agent, or Firm* — Plager Schack LLP; Mark H. Plager; Kara K. Verryt

(57) ABSTRACT

A device for bridging a gap between a tailgate and a truck bed may include an angled bridge plate having a first plate section and a second plate section, wherein the second plate section extends from the first plate section at an angle. A first tab may extend from a first side edge of the first section of the bridge plate, and a second tab may extend from a second side edge of the first section of the bridge plate. The device may also include a first bed hinge configured to attach to a surface of the truck bed adjacent to the gap, wherein the first tab is configured to pivotably engage with the first bed hinge, and a second bed hinge configured to attach to the truck bed adjacent to the gap, wherein the second tab is configured to pivotably engage with the second bed hinge.

6 Claims, 4 Drawing Sheets

(56) References Cited

U.S. PATENT DOCUMENTS

| | | | | |
|---|---|---|---|---|
| 9,016,764 | B2* | 4/2015 | Johnson | B62D 33/0273 |
| | | | | 296/183.1 |
| 9,862,335 | B2* | 1/2018 | Vu | B60R 13/06 |
| 9,862,430 | B1* | 1/2018 | Stojkovic | B62D 33/0273 |
| 9,908,568 | B2* | 3/2018 | Vu | B60R 13/01 |
| 10,252,606 | B2* | 4/2019 | Masumoto | B60J 10/86 |
| 10,421,502 | B2* | 9/2019 | Smith | B62D 33/03 |
| 10,611,317 | B2* | 4/2020 | Smith | B62D 33/0273 |
| 10,793,202 | B2* | 10/2020 | Watson | B62D 33/03 |
| 10,906,480 | B2* | 2/2021 | Williams | B60R 13/06 |
| 11,142,136 | B2* | 10/2021 | Deshpande | B62D 33/0273 |
| 2002/0074818 | A1* | 6/2002 | Presley | B62D 33/0273 |
| | | | | 296/57.1 |
| 2012/0223541 | A1* | 9/2012 | Gianino | B62D 33/0273 |
| | | | | 296/57.1 |
| 2015/0061319 | A1* | 3/2015 | Johnson | B62D 33/0273 |
| | | | | 296/183.1 |
| 2015/0084361 | A1* | 3/2015 | McDermott, III | B62D 33/0273 |
| | | | | 296/57.1 |
| 2015/0344082 | A1* | 12/2015 | Keklak | B62D 33/0273 |
| | | | | 16/250 |
| 2017/0246996 | A1* | 8/2017 | Vu | B60P 7/0815 |
| 2017/0247062 | A1* | 8/2017 | Vu | B60R 13/01 |
| 2019/0241219 | A1* | 8/2019 | Smith | B62D 33/03 |
| 2019/0322225 | A1* | 10/2019 | Smith | B62D 33/0273 |
| 2020/0239085 | A1* | 7/2020 | Watson | B62D 33/0273 |

* cited by examiner

HINGED TAILGATE BRIDGE

BACKGROUND

The embodiments herein relate generally to vehicle accessories, and more particularly, to a hinged tailgate bridge designed to bridge the gap between a truck bed and a truck tailgate.

Trucks, such as pickup trucks that include an openable tailgate, are often used to haul items from one location to another. However, when materials such as rocks, dirt, and yard debris are hauled using a pickup truck, the gap between the tailgate and the truck bed tends to get filled with the material during unloading. This can require a user to clean out the space prior to closing the tailgate or risk scratching, denting, or otherwise damaging the truck. In some cases, if too much debris has fallen and become stuck in the space between the tailgate and the truck bed, the tailgate may not properly close. Unfortunately, there are currently no existing devices to help prevent materials from becoming stuck in the space between the tailgate and the truck bed.

Therefore, what is needed is a device for preventing or reducing the likelihood of materials becoming stuck or lodged within the space between a tailgate and a truck bed.

SUMMARY

Some embodiments of the present disclosure include a device for bridging a gap between a tailgate and a truck bed. The device may include an angled bridge plate having a first plate section and a second plate section, wherein the second plate section extends from the first plate section at an angle. A first tab may extend from a first side edge of the first section of the bridge plate, and a second tab may extend from a second side edge of the first section of the bridge plate. The device may also include a first bed hinge configured to attach to a surface of the truck bed adjacent to the gap, wherein the first tab is configured to pivotably engage with the first bed hinge, and a second bed hinge configured to attach to the truck bed adjacent to the gap, wherein the second tab is configured to pivotably engage with the second bed hinge.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
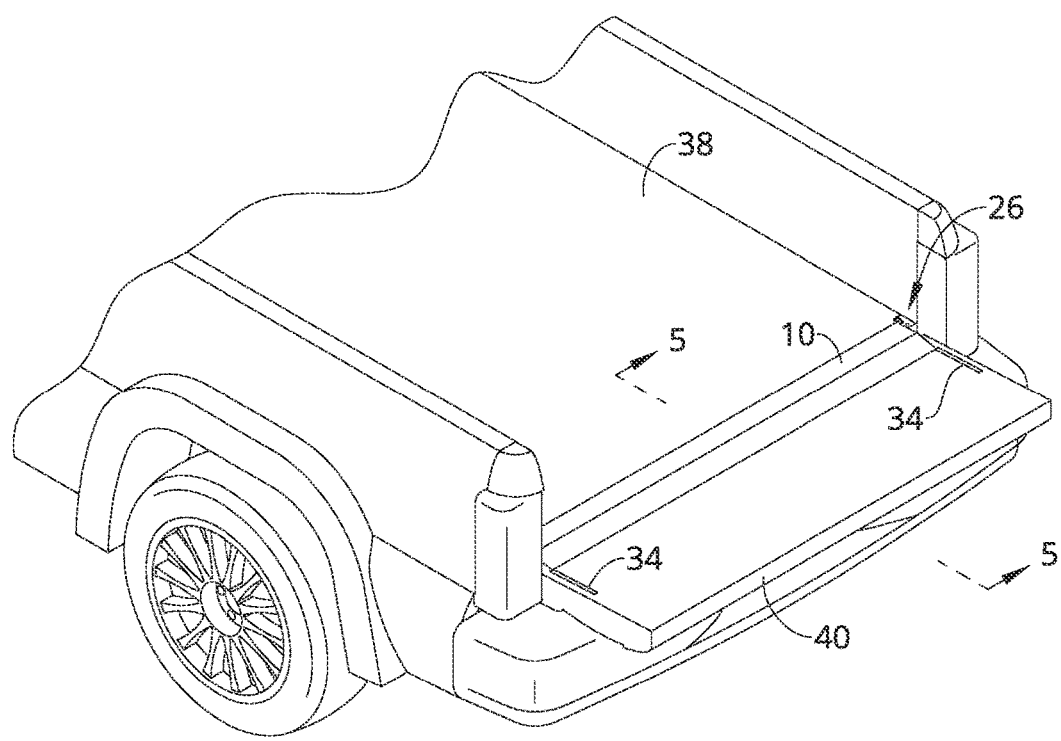
FIG. 1 is a perspective view of one embodiment of the present disclosure, shown installed.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as device for bridging the gap between a tailgate and a truck bed and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The elements of the device of the present disclosure may be related in the following exemplary fashion. It is not intended to limit the scope or nature of the relationships between the various elements and the following examples are presented as illustrative examples only.

By way of example, and referring to FIGS. 1-8, some embodiments of the present disclosure include a device for bridging a gap 42 between a tailgate 40 and a truck bed 38, the device comprising an angled bridge plate 10 comprising a first plate section and a second plate section, wherein the second plate section extends from the first plate section at an angle, a distal edge of the first plate section defines a rear lip of the bridge plate 10, and a distal edge of the second plate section defines a front lip 16 of the bridge plate 10; a first tab 12 extending from a first side edge of the first section of the bridge plate 10 such that an edge of the first tab 12 is planar with the rear lip; a second tab 14 extending from a second side edge of the first section of the bridge plate 10 such that an edge of the second tab 14 is planar with the rear lip; a first bed hinge 18 configured to attach to a surface of a vehicle into which the device is to be installed, such as to a surface of the truck bed 38 adjacent to the gap 42, wherein the first tab 12 is configured to pivotably engage with the first bed hinge 18; and a second bed hinge 26 configured to attached to the surface of the vehicle, such as to the surface of the truck bed 38 adjacent to the gap 42, wherein the second tab 14 is configured to pivotably engage with the second bed hinge 26. Due to the engagement of the first tab 12 and the second tab 14 with the first bed hinge 18 and the second bed hinge 26, respectively, the bridge plate 10 is configured to be secured to while simultaneously being able to change angles with respect to the truck bed 38. In some embodiments, the device may further comprise a glide plate 34 configured to attach to a surface of the tailgate 40, wherein the glide plate 34 aligns with the front lip 16 of the bride plate 10.

As shown in the Figures, the bridge plate 10 may comprise an elongate, substantially rectangular plate with a slight bend therein. A first section of the bridge plate 10 may be defined by the portion of the bridge plate extending from the rear lip of the bridge plate 10 to the bend, and a second section of the bridge plate 10 may be defined by the portion of the bridge plate extending from the bend to the front lip 16. In a particular embodiment, the bend may have an angle of, for example, about 5 to about 10 degrees, such as about 7 degrees. As shown in the Figures, the bridge plate 10 may have a width that closely approximates, but is slightly smaller, than the rear opening in the back of the truck bed 38.

The length of the bridge plate 10 is sufficient to extend from the truck bed 38, across the gap 42, and onto the tailgate 40, wherein the length of the bridge plate 10 is defined as the distance between the rear lip and the front lip 16.

Figure 5:
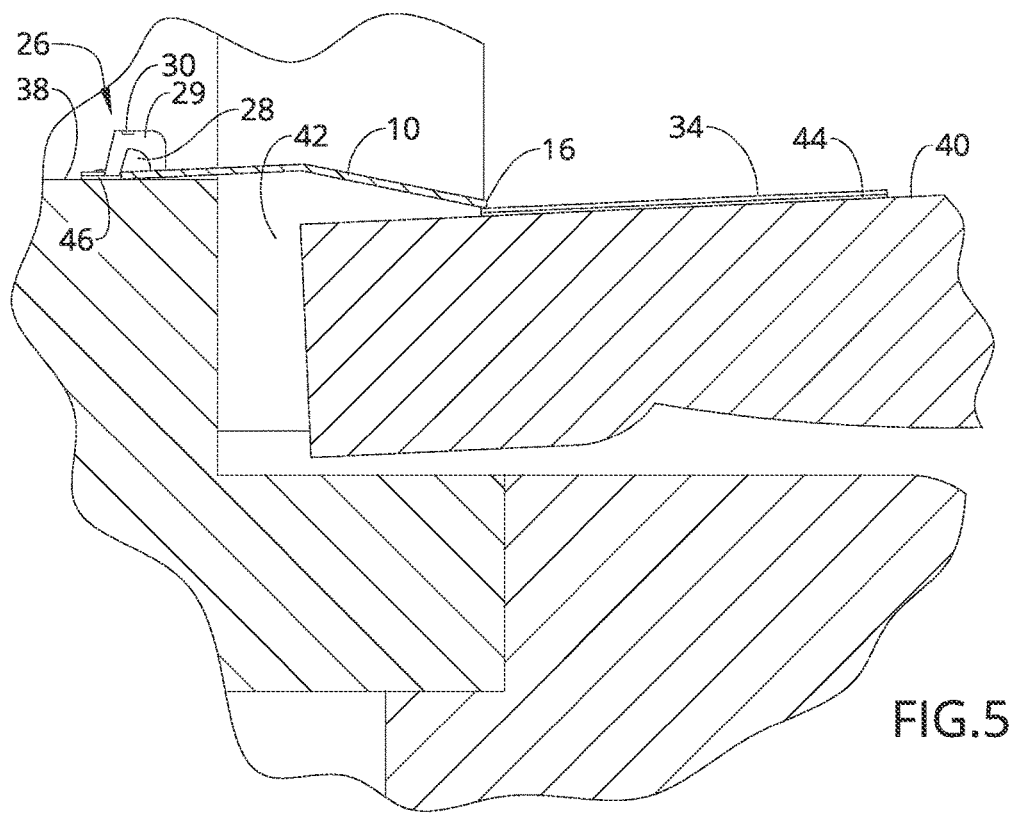
FIG. 5 is section view of one embodiment of the present disclosure, taken along line 5-5 in FIG. 1.
Figure 6:
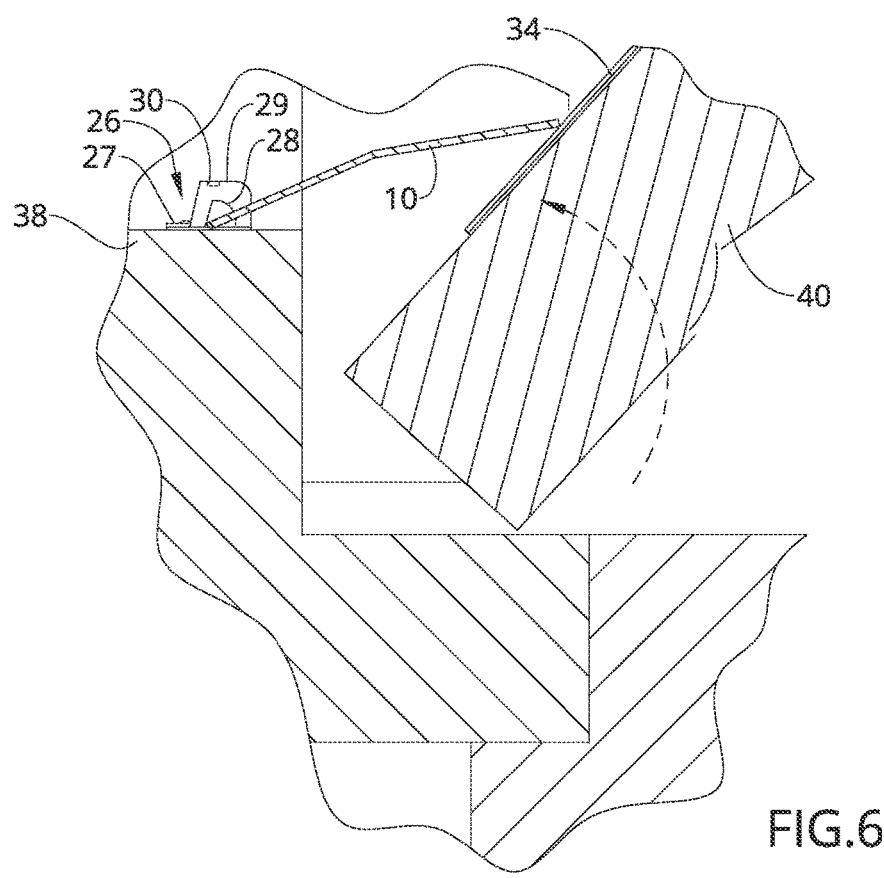
FIG. 6 is a section view of one embodiment of the present disclosure.
Figure 7:
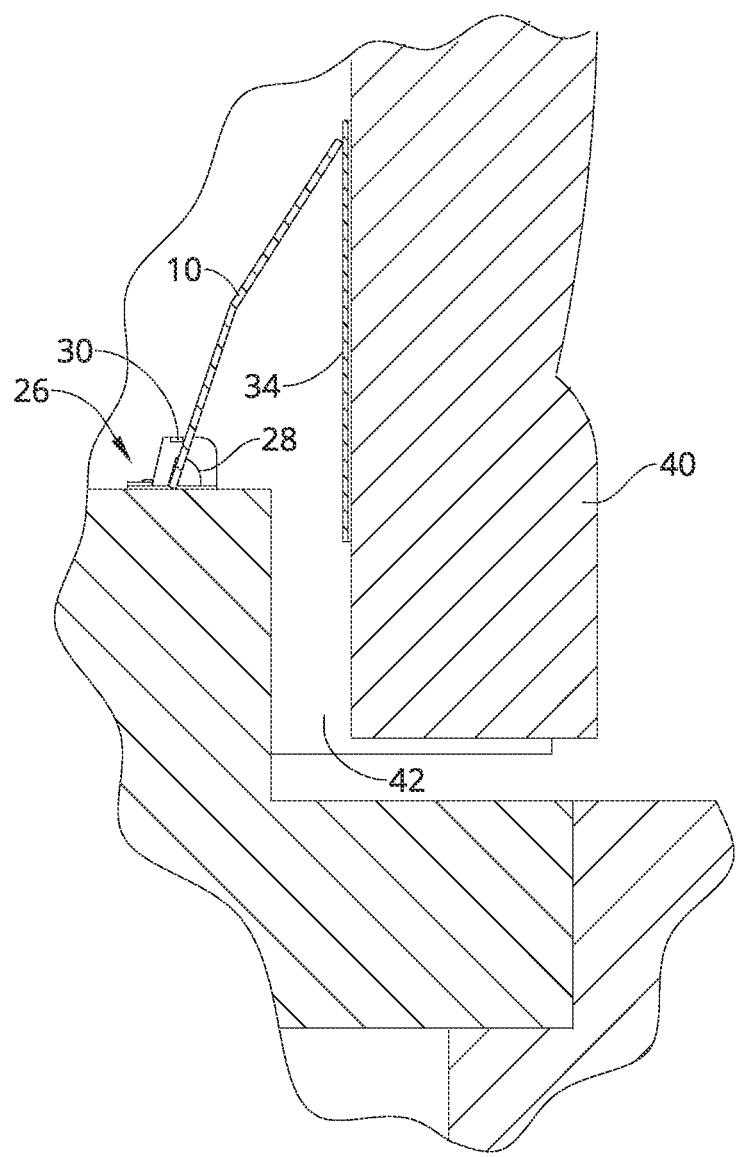
FIG. 7 is a section view of one embodiment of the present disclosure, shown installed and with tailgate 40 closed.

As explained above, the bridge plate 10 may be hingeably attached to the truck bed 38, such that the bridge plate can change angles with respect to the truck bed 38 and wherein the front lip 16 of the bridge is configured to slide upwards and downwards along a height of the tailgate 40. When the tailgate 40 is open, as shown in FIG. 5, the first section of the bridge plate 10 may be planar with the truck bed 38, and the front lip of the bridge plate 10 may extend to the tailgate 40, thus bridging or covering the gap 42 between the tuck bed 38 and the tailgate 40. When the tailgate 40 is closed (or closing), as shown in FIG. 6, the front lip 16 of the bridge plate 10 is configured to slide up and down the tailgate 40.

Figure 2:
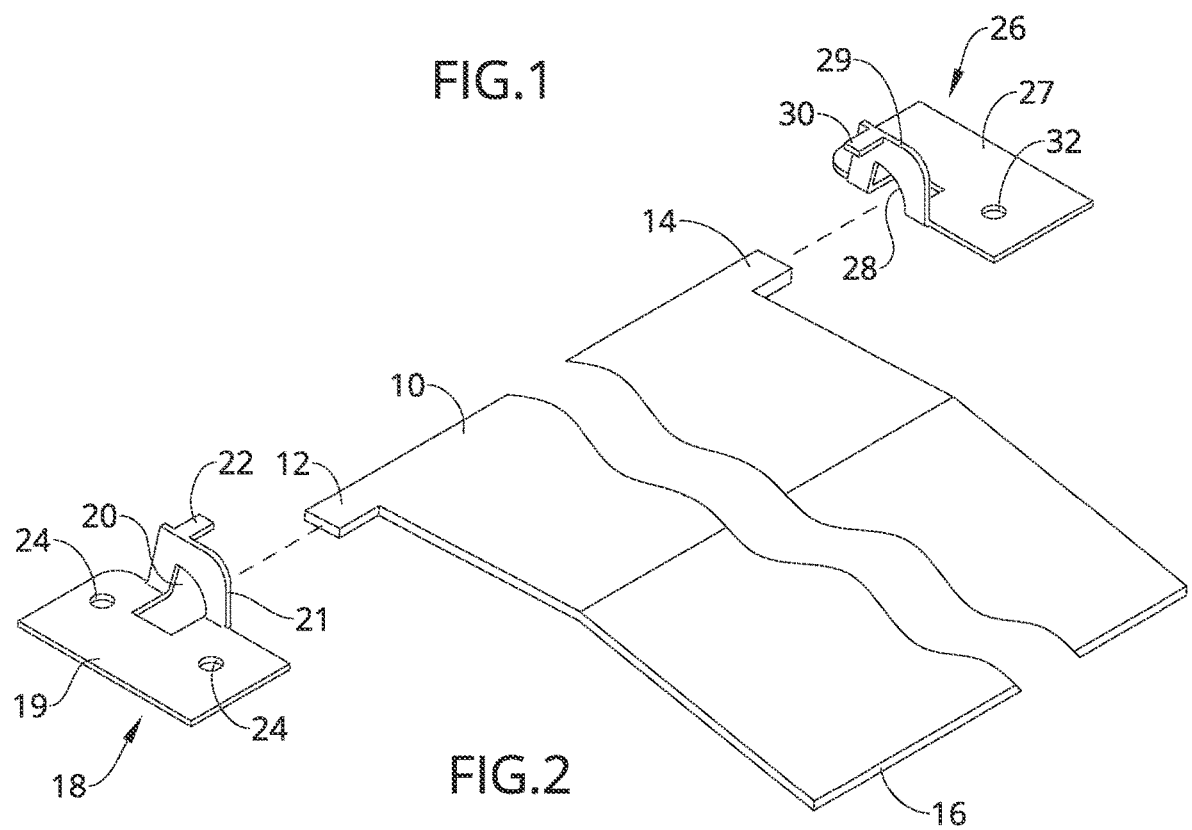
FIG. 2 is a perspective view of one embodiment of the present disclosure.
Figure 3:
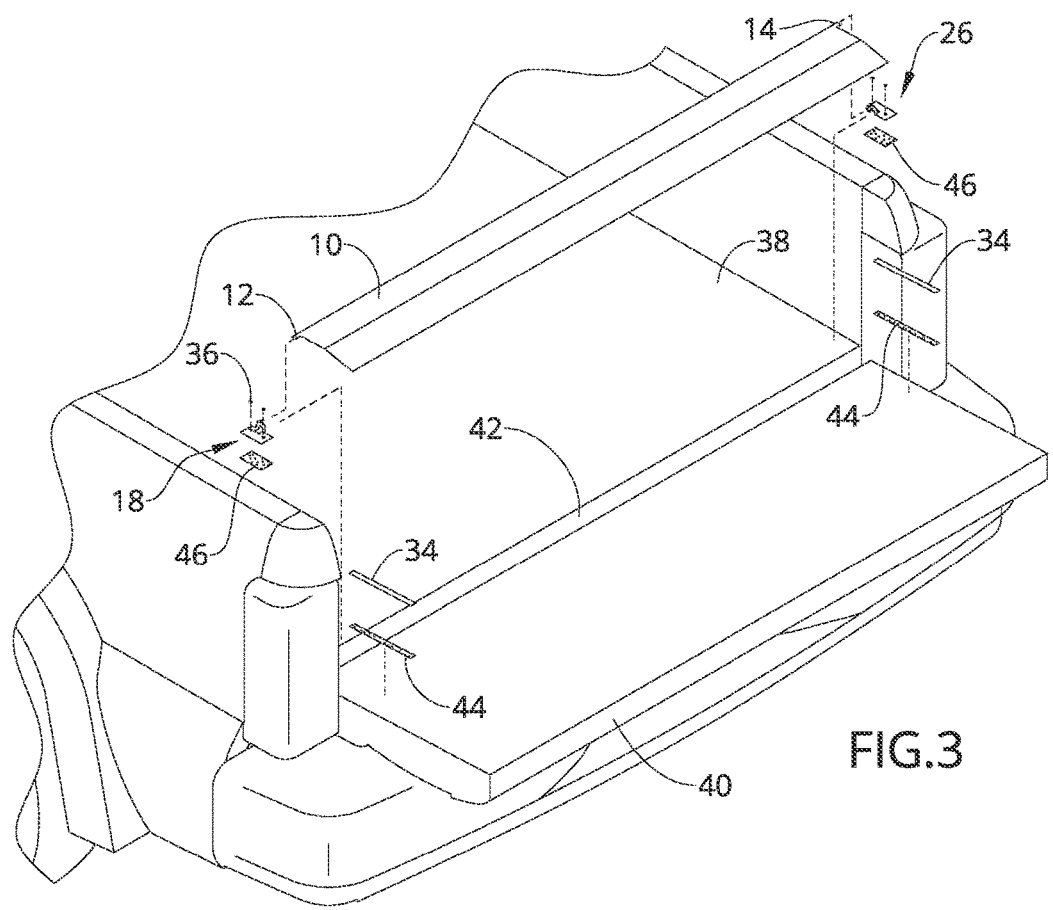
FIG. 3 is an exploded view of one embodiment of the present disclosure, illustrating installation.
Figure 4:
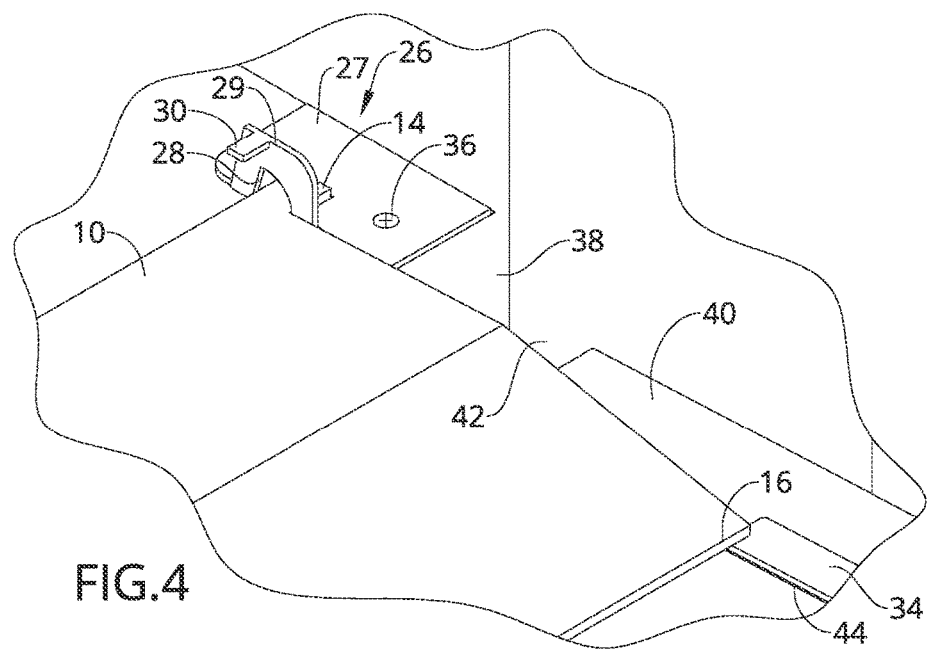
FIG. 4 is a detail view of one embodiment of the present disclosure, shown installed.
Figure 8:
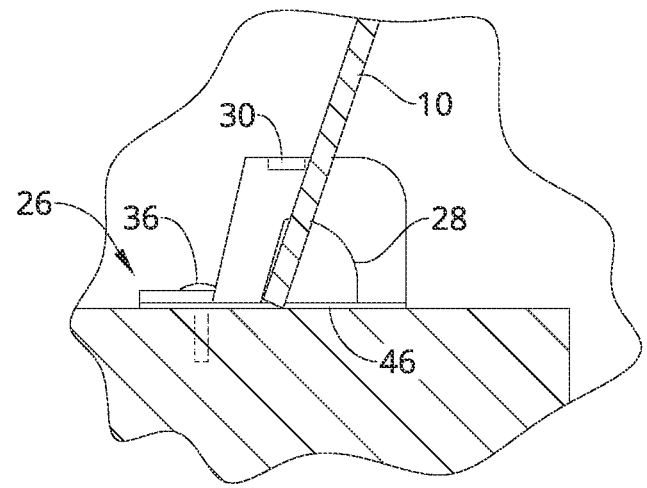
FIG. 8 is a detail perspective view of one embodiment of the present disclosure, shown installed with tailgate 40 closed.

As described above, the bridge plate 10 may be hingeably attached to the truck bed 38 such that it is configured to change angles with respect to the truck bed 38. More specifically, and as also described above, the bridge plate 10 may be pivotably or rotatably engaged with a pair of bed hinges. More specifically, and as shown in FIG. 2, the pair of bed hinges may comprise a first bed hinge 18 and a second bed hinge 26, wherein the first bed hinge 18 is a mirror image of the second bed hinge 26. The first bed hinge 18 may comprise a first hinge plate 19 being a substantially planar plate configured to sit on or attach to a surface of the truck bed 38. For example, the first hinge plate 19 may comprise at least one, such as a pair of, first hinge plate fastener orifices 24 extending therethrough, wherein a fastener, such as screw 36, may be configured to extend through the first hinge plate 19 to secure the first hinge plate 19 to the truck bed 38. In some embodiments, the first hinge plate 19 may be alternatively or additionally attached to the truck bed 38 using an adhesive pad 46 configured to adhere the bottom surface of the first hinge plate 19 to the truck bed 38. As shown in the Figures, the first bed hinge 18 may further comprise a first hinge tab 21 extending upward from an inner edge of the first hinge plate 19, wherein an inner edge is defined as the edge of the first hinge plate 19 facing the bridge plate 10, when installed. The first hinge tab 21 and the inner edge of the first hinge plate 19 may have a first hinge slot 20 extending therethrough, wherein the first hinge slot 20 may have dimensions suitable for fitting the first tab 12 therein and for allowing the first tab 12 to rotate therein. A top edge of the first hinge tab 21 may have a first stop 22 extending substantially perpendicularly therefrom, wherein the first stop 22 may extend away from the first hinge plate 19 and toward the bridge plate 10 when installed. The first stop 22 may function to prevent the bridge plate 10 from rotating past a specific angle with respect to the truck bed 38, as shown in FIG. 8.

As mentioned above, the second bed hinge 26 may have a structure that mirrors that of the first bed hinge 18. Thus, the second bed hinge 26 may comprise a second hinge plate 27 that is substantially planar with a second hinge tab 29 extending upward from an inner edge thereof, wherein a second hinge slot 28 extends through the second hinge tab 29 and the second hinge plate 27, the second hinge slot 28 being sized to accommodate rotatable insertion of the second tab 14 therein. A second hinge stop 30 may extend substantially perpendicularly outward from a top edge of the second hinge tab 29. The second hinge plate 27 may have at least one second hinge fastener orifice 32 extending therethrough.

While it is described above that the bridge plate 10 may be hingeable attached to the truck bed 38 using the first bed hinge 18 and the second bed hinge 28 described above, the use of other types of hinges are envisioned.

In embodiments, the device of the present disclosure may further comprise at least one glide plate 34 configured to attach to an interior face of the tailgate 40 and align with a track of movement of the front lip 16 of the bridge plate 10. In some embodiments, the device may comprise a pair of glide plates 34, each positioned to align with the track of motion of each corner of the front lip 16 of the bridge plate 10. As shown in the Figures, each of the glide plates 35 may be substantially rectangular; however, the use of other shapes is envisioned. The glide plates 34 may be attached to the interior face of the tailgate 40 using any suitable or known fastening means and, in some embodiments, may be adhered to the interior face using an adhesive strip 44.

The device of the present disclosure may be made of any suitable material, such as metal or a durable plastic. While the dimensions of the component of the device may vary depending on the dimensions of the truck bed, in general, the components may be sized such that the bridge plate 10 fits within the interior width of the truck bed and is long enough to cover the gap 42 between the truck bed 38 and the tailgate 40 when the tailgate 40 is open.

To use the device of the present disclosure, it must first be installed on the vehicle. To do so, the hinges may be attached to the truck bed, allowing the bridge plate to be engaged therewith. When desired, the glide plate(s) may be attached to the interior face of the tailgate. The user may simply open and close the tailgate, allowing the bridge plate to glide or slide along the interior face of the tailgate and covering the gap when the tailgate is open.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A device for bridging a gap between a tailgate and a truck bed, the device comprising:
   an angled bridge plate comprising a first plate section and a second plate section, wherein:
   the second plate section extends from the first plate section at an angle;
   a distal edge of the first plate section defines a rear lip of the bridge plate; and
   a distal edge of the second plate section defines a front lip of the bridge plate;
   a first tab extending from a first side edge of the first section of the bridge plate;
   a second tab extending from a second side edge of the first section of the bridge plate;
   a first bed hinge configured to attach to a surface of the truck bed adjacent to the gap, wherein the first tab is configured to pivotably engage with the first bed hinge, the first bed hinge comprising:
   a first hinge plate;
   a first hinge tab extending upward from an inner edge of the first hinge plate, the inner edge being defined as an edge of the first hinge plate facing the bridge plate, when installed; and
   a first hinge slot extending through the first hinge tab and the inner edge of the first hinge plate, the first hinge slot sized to accommodate pivotable insertion of the first hinge tab therein; and a second bed hinge configured to attach to the truck bed adjacent to the gap, wherein the second tab is configured to pivotably engage with the second bed hinge, the second bed hinge comprising:
- a second hinge plate;
- a second hinge tab extending upward from an inner edge of the second hinge plate, the inner edge being defined as an edge of the second hinge plate facing the bridge plate, when installed; and
- a second hinge slot extending through the second hinge tab and the inner edge of the second hinge plate, the second hinge slot sized to accommodate pivotable insertion of the second hinge tab therein, wherein the second hinge plate is a mirror image of the first hinge plate.

2. The device of claim 1, further comprising at least one glide plate configured to attach to an interior face of the tailgate, the at least one glide plate positioned to align with the front lip of the bridge plate.

3. The device of claim 1, wherein the bridge plate comprises an elongate, substantially rectangular plate with a bend therein, the bend defining the angle between the first plate section and the second plate section.

4. The device of claim 3, wherein the angle is from about 5 to about 10 degrees.

5. The device of claim 1, further comprising:
- a first stop extending substantially perpendicularly from a top edge of the first hinge tab; and
- a second tab extending substantially perpendicularly from a top edge of the second hinge tab.

6. The device of claim 1, further comprising a pair of first hinge plate fastener orifices extending through the first hinge plate and a pair of second hinge plate fastener orifices extending through the second hinge plate.

* * * * *